United States Patent Office 3,446,023
Patented May 27, 1969

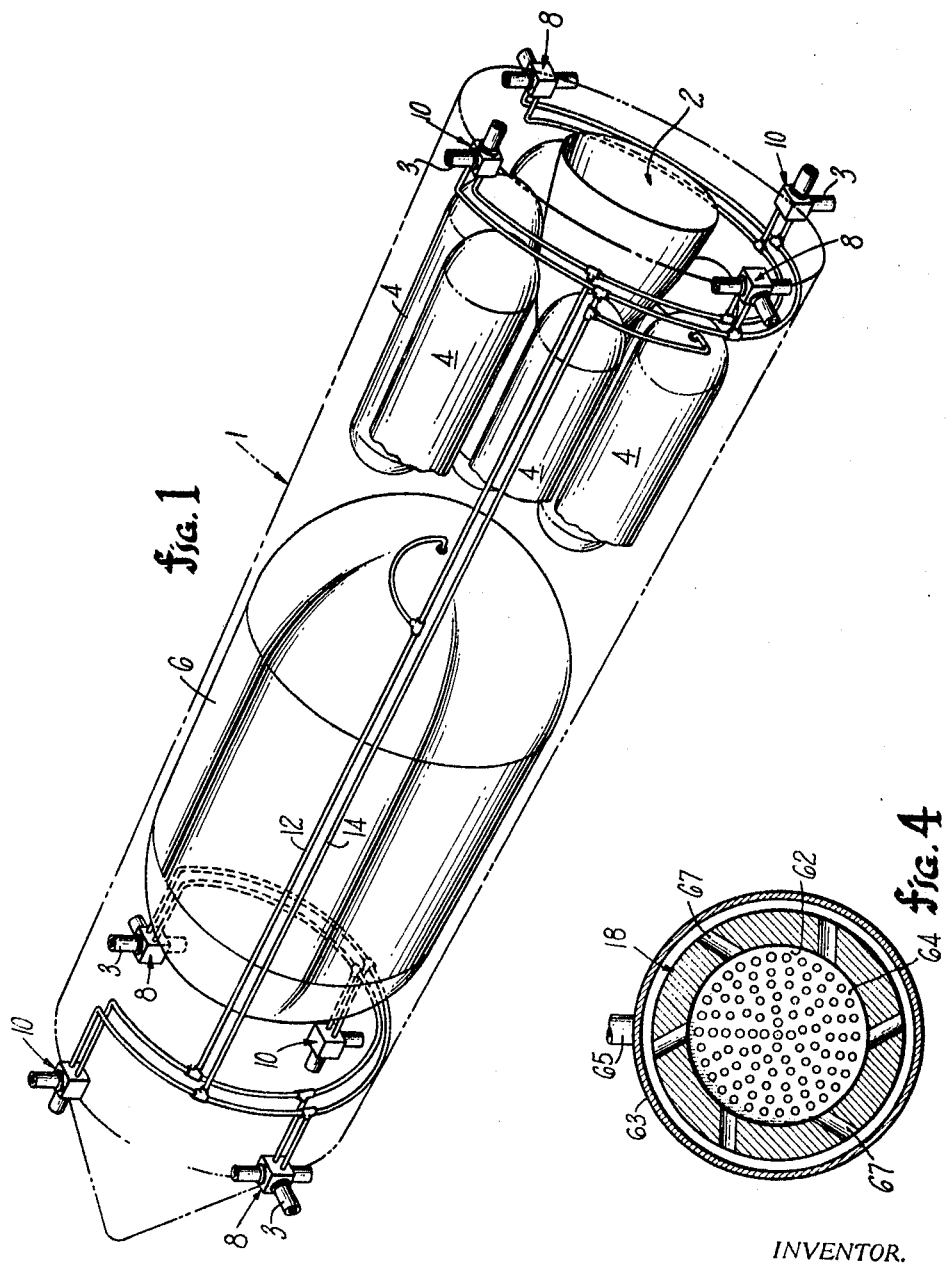

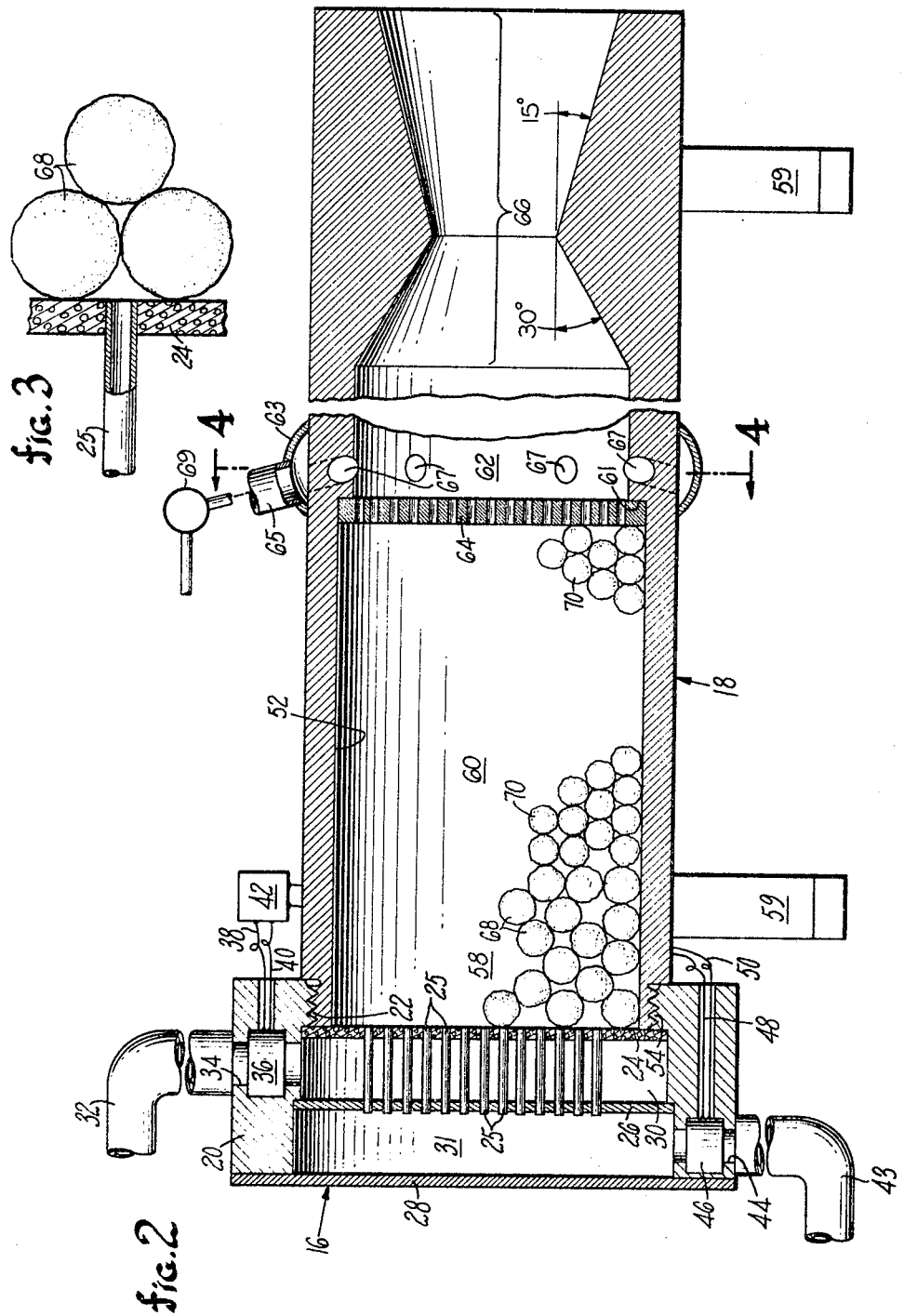

3,446,023
CATALYTIC ATTITUDE-CONTROL ROCKET MOTOR

Stanley A. Mosier, North Palm Beach, Fla., assignor to United Aircraft Corporation, East Hartford, Conn., a corporation of Delaware
Filed Aug. 5, 1966, Ser. No. 570,479
Int. Cl. F02k 9/02
U.S. Cl. 60—257               12 Claims

ABSTRACT OF THE DISCLOSURE

A catalytic rocket motor including an injector means having an injector face with a rocket body extending from said face. The rocket body having a primary reaction chamber in which ignition is obtained. A nozzle being located downstream of said primary reaction chamber and a propellant pretreatment chamber being located upstream of said primary reaction chamber and downstream of said injector face. Said propellant pretreatment chamber containing non-catalytic refractory pellet means and said primary reaction chamber containing reaction promoting catalytic pellet means.

---

This invention relates to a catalytic rocket motor for a bipropellant combination and more particularly to a rocket motor adapted to provide attitude control which uses an oxygen-hydrogen propellant combination.

It is an object of this invention to provide a catalytic rocket motor for producing regulative attitude-control thrust using an oxygen-hyrogen combination without the necessity of an external ignition energy source.

Another object of this invention is to provide a catalytic rocket motor which can use the main stage propellants of a bipropellant rocket motor to provide energy for attitude control. With this arrangement, it is not necessary to carry with the primary or main rocket motor system a third propellant, or more, for supplying energy for attitude control. Hence, additional propellant tankage, controls, and associated hardware can be eliminated thereby making a more efficient, compact and lightweight overall system.

A further object of this invention is to provide a catalytic rocket motor having a performance which can exceed that of present attitude control motors normally operated with hydrogen peroxide, hydrazine, etc. at the same propellant flow rate and chamber pressure.

Another object of this invention is to provide a catalytic rocket motor having means for protecting the propellant injector face from severe overheating and burnout by separating the face of the injector from the catalyst using a pretreatment region in which a quantity of refractory material is contained.

A further object of this invention is to provide a catalytic rocket motor having means provided for more completely mixing, and making homogeneous, the oxidizer/fuel mixture as it enters the catalyst bed.

Another object of this invention is to provide a catalytic rocket motor having means for preventing hot gas or flame from flashing straight back from the catalyst bed to the face of the injector. By controlling the size of the refractory material in the pretreatment region, the fluid path from the injector to the catalyst can be controlled such that the maximum passage size does not exceed the quenching distance of the flame that results from the oxidizer/fuel reaction or propellant decomposition.

It is a further object of this invention to provide a catalytic rocket motor having a secondary oxidizer supply and injection system for injecting an oxidizer downstream of the primary combustion chamber to react with the products of combustion therefrom therein providing an increase in motor performance above that obtained from the primary combustion chamber alone.

Other objects and advantages will be apparent from the specification and claims and from the accompanying drawings which illustrate embodiments of the invention.

FIGURE 1 is a schematic view showing a space vehicle, with a main rocket motor, having attitude control motors located in clusters along the front and rear thereof.

FIGURE 2 is a diagrammatic longitudinal view of a catalytic rocket motor showing the invention.

FIGURE 3 is an enlarged view showing an attachment of the oxidizer flow tubes to the face of the injector.

FIGURE 4 is a view taken along the line 4—4 of FIGURE 2.

As shown in FIGURE 1, the spacecraft 1 has a main rocket engine 2 and associated control system providing for the propulsion thereof. The main rocket engine 2 is of the type requiring two propellants, one of which is stored in tank 4 and the other of which is stored in tank 6. This engine can be of the type as shown in U.S. Patent No. 3,161,017 using hydrogen and an oxidizer as the propellants.

Around the forward and rearward end of the spacecraft, clusters of attitude control rocket motors 3 are located to reposition the spacecraft when necessary. At the rear, two clusters 8 of three motors are located diametrically apart and two clusters 10 having two motors are located diametrically apart 90° from the other pair. Similar clusters 8 and 10 of the attitude control rocket motors are located at the front end of the spacecraft in the same manner. As can be seen, supply lines 12 and 14 extend from each of the propellant storage means to the clusters to provide the oxidizer and fuel therefor.

While the catalytic attitude control rocket motor 3 is shown in clusters in FIGURE 1, FIGURE 2 shows schematically the basic parts of each of the individual motors. The two main parts of each motor are the injector head 16 and rocket body 18. The injector head 16 is formed having a housing 20 with a stepped opening extending therethrough having three stepped sections of decreasing diameter from front to rear. Said rearward opening is circular and internally threaded at 22 to receive one end of the motor body. A porous metal fuel injection plate 24 is fixed adjacent the inner end of the threaded portion 22 at the annular abutment formed where the rearward and center stepped sections meet. A solid plate 26 is fixed adjacent the annular abutment formed where the center and forward stepped sections meet and a solid metal plate 28 is attached to the front of the body 20. The plates 24, 26 and 28 can be brazed in place or fixed by any satisfactory means desired. A first propellant manifold 30 is formed between plates 24 and 26 to receive a fuel and a second propellant manifold 31 is formed between the plates 26 and 28 to receive an oxidizer.

Oxidizer cylindrical injection elements 25 extend from the oxidizer manifold 31 to a point flush with the porous metal fuel injection plate 24. While the injection elements are fixed to the openings extending through plate 26 to prevent the two propellants from coming in contact at that point, the injection elements may be spaced from the fuel injection plate 24 to provide an annulus therebetween for a greater flow of fuel if necessary.

A conduit 32 connects a fuel supply to an opening 34 in the housing 20. A solenoid valve 36 is positioned adjacent the end of the conduit 32 which projects into the opening 34. The solenoid valve 36 is used for starting or stopping the flow of fuel to the manifold 30. Wires 38 and 40 carry signals from a control 42 to the solenoid valve to operate it. Control 42 can be responsive to a gyroscope or have a manual operating means.

A conduit 43 connects an oxidizer supply to an opening 44 in the housing 20. A solenoid valve 46 is positioned adjacent the end of the conduit 43 which projects into the opening 44. The solenoid valve 46 is used for starting or stopping the flow of oxidizer to the manifold 31. Wires 48 and 50 carry signals from control 42 to the solenoid valve to operate it. While the solenoid valves 36 and 46 are shown located in the housing 20, they may be positioned elsewhere along conduits 32 and 43, respectively, to control flow therein.

The rocket body 18 is formed having a cylindrical outer surface threaded externally at one end at 54. The external threads at 54 of the rocket motor are adapted to engage the internal threads at 22 to fix the injector head 16 and rocket body 18 together. While one connecting means has been shown, any other satisfactory means can be used. The body 18 has an opening 52 extending through its length. The opening 52 is formed from the front as a propellant pretreatment chamber 58, a primary reaction chamber 60, a secondary reaction chamber 62, and a convergent-divergent nozzle 66. Chambers 60 and 62 are separated by a catalyst retainer plate 64 which is fixed to the rocket body 18. Plate 64 is reinforced to hold pellets therein in place. The pellets will be hereinafter discussed. Chambers 60 and 62 are of different diameters so an annular abutment 61 is formed between them. Plate 64 is positioned against this abutment. The convergent-divergent expansion nozzle 66 extends from the downstream end of the secondary reaction chamber to the free end of the rocket body 18. The rocket body 18 may have brackets 59 for fixedly positioning it with a vehicle. However, when multiple clusters of two or three are made, other means of support can be used.

To obtain greater performance, arrangements are made for the injection of the oxidizer into the secondary reaction chamber 62. The oxidizer is injected at this point so that the catalyst temperature limit will not be exceeded. A secondary oxidizer manifold 63 is positioned around the rocket body 18 having an oxidizer inlet conduit 65. Conduit 65 is connected to an oxidizer supply and a valve 69 is located therein to control the flow therethrough. This valve can be operated by the control 42 or by other desirable means. The interior of the manifold 63 is connected to the forward part of the secondary reaction chamber by passages 67. In one rocket body construction, these passages were drilled inwardly at an angle of approximately 15° in a forwardly direction to a plane normal to the centerline of the rocket motor. They were also drilled at an angle to increase the turbulence level in the secondary reaction chamber (see FIG. 4). The angle should be between 30° and 45° from a radial line.

The pretreatment chamber is filled with pellets 68 which are shown as roughly spherical in shape and made of nonreactive refractory material and the primary reaction chamber 60 is filled with pellets 70 which are shown as roughly spherical in shape and made of an oxidation-promoting catalyst. Pellets 68 must be of such size and shape to permit a desired propellant flow through the pretreatment chamber in one direction and prevent a direct path back to the face of the injector from the primary reaction chamber in the other direction.

The number of oxidizer injection elements 25 depends on available cross-sectional area of the pretreatment chamber 58 and allowable oxidizer pressure loss. In tests where the pretreatment chamber 58 had a cross-sectional area of 1.21 sq. in., the number of oxidizer injection elements was varied from 50 to 130 which would be from approximately 40 elements per square inch to approximately 110 elements per square inch. The total face area of the oxidizer injection element openings varied from .01 to .03 sq. in.

For a motor having an injector face area of 1.21 sq. in. the porosity of the fuel injection plate 24 should permit between approximately 120 and 1200 standard cubic feet of airflow per minute therethrough at a pressure differential of 2 p.s.i.

As stated hereinbefore, the pretreatment chamber 58 contains a granular form of refractory material to separate the face of the injector from the primary reaction chamber 60 containing the catalyst bed of pellets. Since the fundamental function of the refractory material is to isolate the downstream face of the injector plate 24 from the site of catalytic combustion, it must itself be nonreactive with the propellants and chemically stable or inert at the operating temperatures of the catalyst. Within these guidelines, the particular composition of the refractory material is relatively unimportant and many refractory compositions will be found suitable including in the $H_2/O_2$ systems the refractory oxides such as zirconia ($ZrO_2$), hafnia ($HfO_2$), thoria ($ThO_2$) and beryllia (BeO); the refractory carbides such as zirconium carbide (ZrC), hafnium carbide (HFC), thorium carbide (ThC), beryllium carbide ($Be_2C$), and the tungsten carbides (WC and $W_2C$); and the refractory nitrides such as beryllium nitride ($Be_3N_2$), titanium nitride (TiN), silicon nitride (SiN) and boron nitride (BN).

In a rocket motor built, the combined pretreatment chamber 58 and primary reaction chamber 60 was approximately 3.2″ in length and the total length of the rocket body 18 was approximately 5.5″. The refractory material in this case should be no less than .5″ in length between the injector face and the beginning of the catalyst bed in the primary reaction chamber for propellant total flow rates less than .05 lb./sec. for mixture ratios not exceeding 1.3. At the combustion temperature corresponding to a mixture ratio of 1.3 for the oxygen-hydrogen combination, the catalyst has been found to experience pellet-to-pellet softening. The length of the pretreatment chamber 58 housing the refractory bed increases linearly until at a propellant total flow rate of approximately .3 lb./sec., the length should be 1.5″. In a test made, zirconia refractory material was used having nominal ⅛″ solid spheres. In other tests, the diameter of the refractory pellets ranged from $\frac{1}{16}''$–$\frac{5}{16}''$. For varying the size of the motor, usual scaling procedures can be used.

The primary reaction chamber 60 is an extension of the pretreatment chamber and is not separated physically therefrom. The primary reaction chamber 60 contains the granular oxidation-promoting catalyst on which surface the oxidation of the fuel takes place. The particular catalyst employed in a given system to promote the reaction of the propellant or between a fuel and oxidizer will be selected in accordance with the particular system contemplated. It must of course itself be stable to the propellants at operating temperatures encountered. In the case of a system using hydrogen and oxygen, the more preferred catalysts comprise the noble metals and their oxides impregnated in a carrier of high surface area aluminium oxide: for example, platinum-promoted rhodium or palladium on activated alumina. In tests conducted of the various noble metal—impregnated activated alumina catalysts, it was found that ⅛″ diameter spheres of platinum-promoted rhodium (in the weight ratio of 2/3) of which the noble metal content constituted less than 1% by weight of the combined metal-alumina weight provided the most rapid ignition of propellants. In other tests, the diameter of the catalyst pellets ranged from $\frac{1}{16}''$–$\frac{5}{16}''$. Using this type of catalyst, the quantity required for optimum reaction response can be determined from the space velocity relationship where:

$$\text{space velocity} = \frac{\text{volumetric flow of propellants}}{\text{volume of catalyst required}}$$

Knowing the weight flow and the propellant inlet temperature and pressure, the volumetric flow of propellants can be calculated. From our experience, the space velocity best operating range for combustion system response was from 5,000,000 to 50,000,000. At values of space velocity below 5,000,000, the response of the combustion system became undesirably slow for attitude control motors. Using a value of space velocity between 5,000,000 and 50,000,000 and knowing the volumetric flow of propellants, the volume of catalyst required can be figured out.

With reference to the injection of oxidizer into secondary reaction chamber 62, the valve 69 could be controlled so as to be actuated when a predetermined thrust rating was obtained to maintain it, or if a predetermined maximum permissible temperature was reached in the nozzle itself. The valve 69 would be actuated to keep the temperature at or below the set value.

It is to be understood that the invention is not limited to the specific description above or to specific figures shown, but may be used in other ways without departure from its spirit as defined by the following claims.

I claim:

1. A catalytic rocket motor having an injector head, said injector head having an injector face through which propellant passes, a rocket body extending from said injector head around said face, said rocket body including:
   (a) a primary reaction chamber in which the propellant is ignited,
   (b) a nozzle for exhausting gases,
   (c) a propellant pretreatment chamber between said primary reaction chamber and said injector face for permitting propellant flow in one direction from said injector face and preventing straight line pasageways in the other direction to said injector face,
   (d) said propellant pretreatment chamber containing non-catalytic refractory pellet means, and
   (e) said primary reaction chamber containing reaction promoting catalytic pellet means.

2. A motor as set forth in claim 1 wherein said non-catalytic pellet means are formed of a material from the group consisting of the refractory oxides, carbides and nitrides.

3. A motor as set forth in claim 1 wherein said reaction promoting catalytic pellet means comprise an activated alumina carrier impregnated with platinum and rhodium.

4. A motor as set forth in claim 1 wherein said non-catalytic pellet means are formed of a material from the group consisting of the refractory oxides, carbides and nitrides, and said reaction promoting catalytic pellet means comprise an activated alumina carrier impregnated with platinum and rhodium.

5. A motor as set forth in claim 1 wherein said propellant pretreatment chamber and primary reaction chamber are coextensive and are located between the face of the injector and a retainer plate fixed to the interior of the rocket body upstream of said nozzle.

6. A catalytic rocket motor having an injector head, said injector head having an injector face through which propellant passes, a rocket body extending from said injector head around said face, said rocket body including:
   (a) a propellant pretreatment chamber for permitting propellant flow in one direction from said injector face and preventing straight line passageways in the other direction to said injector face,
   (b) a primary reaction chamber in which the propellant is ignited,
   (c) a nozzle for exhausting gases, and
   (d) said propellant pretreatment chamber containing non-catalytic refractory pellets, said non-catalytic pellets being formed of a material from the group consisting of the refratory oxides, carbides and nitrides.

7. A catalytic rocket motor having an injector head, said injector head having an injector face through which propellant passes, a rocket body extending from said injector head around said face, said rocket body including:
   (a) a propellant pretreatment chamber for permitting propellant flow in one direction from said injector face and preventing straight line passageways in the other direction to said injector face,
   (b) a primary reaction chamber in which the propellant is ignited,
   (c) a nozzle for exhausting gases, and
   (d) said propellant pretreatment chamber containing non-catalytic refractory pellets wherein said pellets are made of zirconia.

8. A catalytic rocket motor having an injector head, said injector head having an injector face through which propellant passes, a rocket body extending from said injector head around said face, said rocket body including:
   (a) a propellant pretreatment chamber for permitting propellant flow in one direction from said injector face and preventing straight line passageways in the other direction to said injector face,
   (b) a primary reaction chamber in which the propellant is ignited,
   (c) a nozzle for exhausting gases, and
   (d) said propellant pretreatment chamber containing non-catalytic refractory pellets,
   (e) said pellets being of such a size to permit a predetermined amount of propellant therethrough and prevent hot gas or flame from flashing straight back from the primary reaction chamber to the face of the injector,
   (f) said pellets being in the range of $1/16''$–$5/16''$ in diameter.

9. A catalystic rocket motor having an injector head, said injector head having an injector face through which propellant passes, a rocket body extending from said injector head around said face, said rocket body including:
   (a) a propellant pretreatment chamber for permitting propellant flow in one direction from said injector face and preventing straight line passageways in the other direction to said injector face,
   (b) a primary reaction chamber in which the propellant is ignited, and
   (c) a nozzle for exhausting gases,
   (d) said propellant pretreatment chamber having a length greater than approximately 9% of the length of the rocket body and the combined propellant pretreatment chamber and primary reaction chamber being approximately 60% of the length of the rocket body.

10. A catalytic rocket motor having an injector head, said injector head having an injector face through which propellant passes, a rocket body extending from said injector head around said face,
    (1) said injector face being formed of porous material for the injection of one propellant and a plurality of tubes for the injection of another propellant,
    (2) said rocket body including:
        (a) a propellant pretreatment chamber containing refractory pellets for permitting propellant flow in one direction from said injector face and preventing straight line passageways in the other direction to said injector face,
        (b) a primary reaction chamber in which the propellant is ignited, and
        (c) a nozzle for exhausting gases,
        (d) the length of the propellant pretreatment chamber being fixed at a value of between 9%–27% of the length of the rocket body as the propellant total flow rate is set in the range of from .05 lb./sec. to .3 lb./sec.

11. A catalytic rocket motor having an injector head, said injector head having an injector face through which propellant passes, a rocket body extending from said injector head around said face,
    (1) said injector face being formed of porous material for the injection of one propellant and a plurality of tubes for the injection of another propellant,
    (2) said rocket body including:
        (a) a propellant pretreatment chamber containing refractory pellets for mixing said propellants and for permitting propellant flow in one direction fro msaid injector face and preventing straight line passageways in the other direction to said injector face, (b) a primary reaction chamber in which the propellant is ignited,
(c) a nozzle for exhausting gases,
(d) said refractory pellets being formed of a material from the group consisting of the refractory oxides, carbides and nitrides, and
(e) the primary reaction chamber containing reaction promoting catalytic pellet means.

12. A motor as set forth in claim 11 wherein said refractory pellets are zirconia and the catalytic pellet means are platinum promoted rhodium on activated alumina.

References Cited

UNITED STATES PATENTS

| | | | |
|---|---|---|---|
| 2,484,221 | 11/1949 | Gulbransen | 60—50 |
| 2,551,112 | 5/1951 | Goddard | 60—260 |
| 2,551,114 | 5/1951 | Goddard | 239—145 |
| 2,584,127 | 2/1952 | Harcum et al. | 60—37 |
| 2,721,788 | 10/1955 | Schad | 23—281 |
| 3,298,182 | 1/1967 | Webb | 60—251 |

FOREIGN PATENTS 386,320  4/1908  France.

MARTIN P. SCHWADRON, *Primary Examiner.*

DOUGLAS HART, *Assistant Examiner.*

U.S. Cl. X.R.

60—39.46